United States Patent [19]
Collins

[11] 3,822,477
[45] July 9, 1974

[54] GOLF CLUB ANALYZER

[76] Inventor: Jan S. Collins, 423 Flormond Ave., Ormond Beach, Fla. 32074

[22] Filed: July 25, 1972

[21] Appl. No.: 275,047

[52] U.S. Cl. ............................................. 33/174 F
[51] Int. Cl. ............................................ G01b 5/24
[58] Field of Search ............ 33/174 R, 174 F, 174 E, 33/195, 1, 75

[56] References Cited
UNITED STATES PATENTS
2,546,426  3/1951  Bryant .............................. 33/174 F
2,912,762  11/1959  Semrau ............................ 33/174 E

*Primary Examiner*—Harry N. Haroian
*Attorney, Agent, or Firm*—John N. Randolph

[57] ABSTRACT

A device or instrument for accurately measuring the important variables of a golf club to determine if the club is suitable to the requirements of a particular player. By adjustments of various part of the instrument, the loft, lie, face angle and face height of a golf club, which has been applied to the device, can be quickly and accurately determined.

9 Claims, 6 Drawing Figures

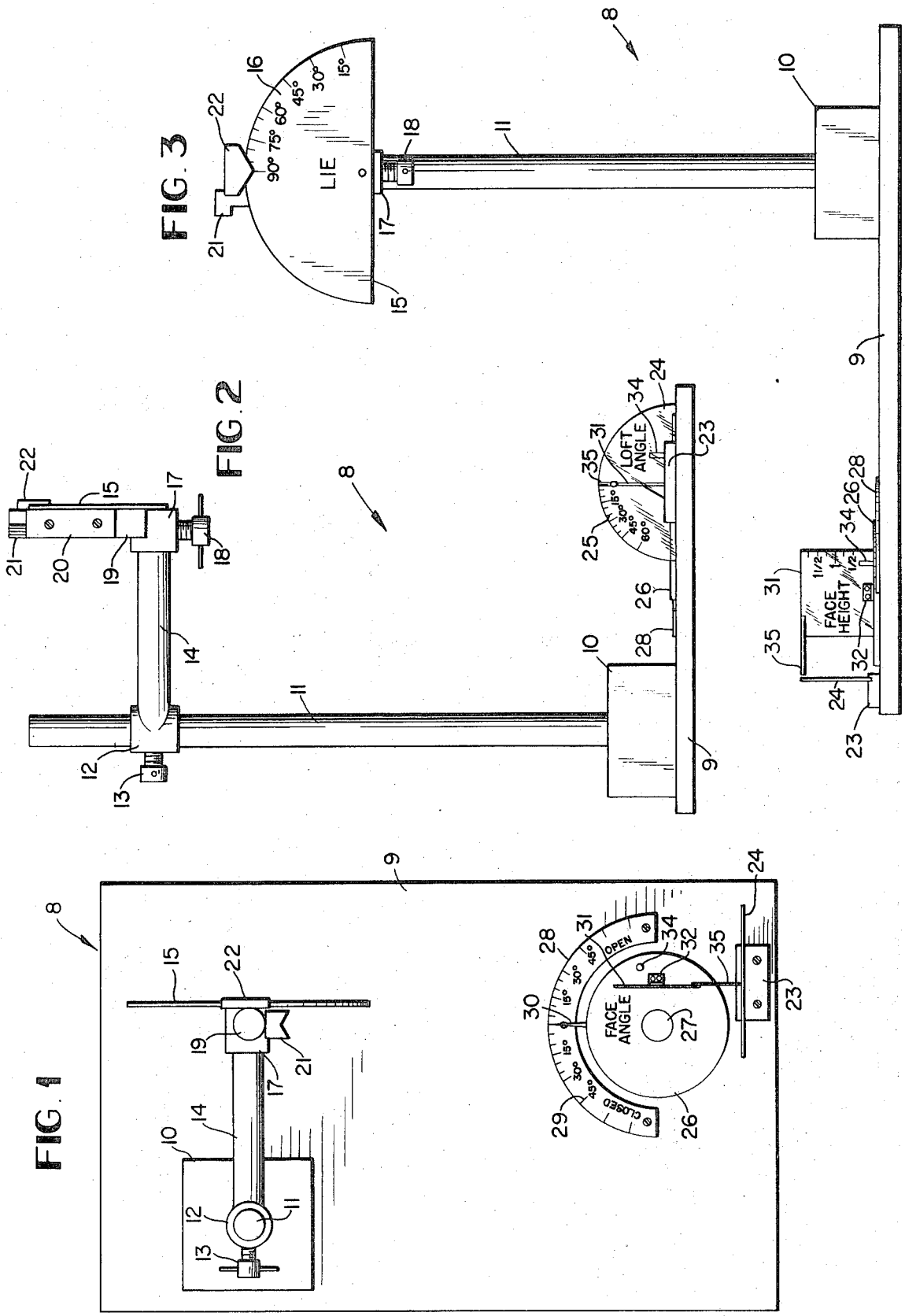

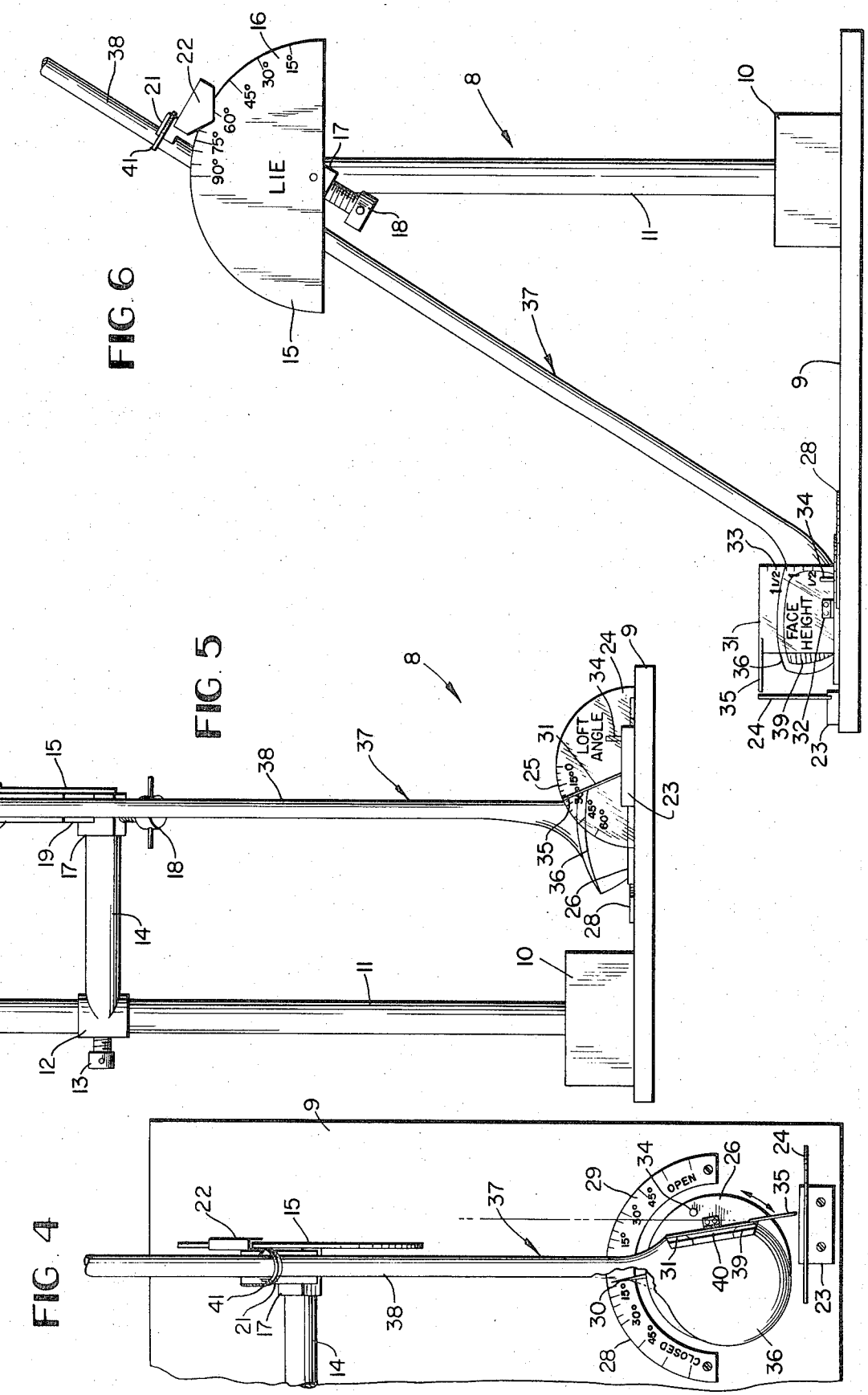

3,822,477

GOLF CLUB ANALYZER

SUMMARY

It is a primary object of the present invention to provide a device which may be quickly and accurately utilized to measure important variables of a golf club to determine whether the characteristics of a particular golf club are suitable to a particular player, or for the purpose of matching golf clubs.

Another object of the invention is to provide a device, the use of which requires no particular skill, to ascertain the various characteristics of a golf club.

Another object of the invention is to provide a device by the use of which it is possible to determine all of the important characteristics of a golf club, which is of a very simple construction so that it may be economically manufactured and sold, and which will be very efficient and durable.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a top plan view of the analyzer or instrument;

FIG. 2 is an end elevational view thereof, looking from the bottom toward the top of FIG. 1;

FIG. 3 is a side elevational view, looking from right to left of FIGS. 1 and 2;

FIG. 4 is a fragmentary top plan view, including the illustration of a portion of a golf club applied to the device;

FIG. 5 is a view corresponding to FIG. 2, with the golf club positioned as in FIG. 4; and FIG. 6 is a view corresponding to FIG. 3, and with the golf club positioned as in FIGS. 4 and 5.

DESCRIPTION OF THE PREFERRED EMBODIMENT

Referring more specifically to the drawings, the golf club analyzer in its entirety is designated generally 8 and includes an elongated flat rigid base 9 which is adapted to rest upon any suitable horizontal supporting surface such as a floor or table. A block 10 is mounted on and secured to the upper side of the base 9, adjacent one corner thereof, and an upright or post 11 is fixed to and rises from the block 10 and is disposed perpendicular to the plane of the base 9. A collar 12 is slidably mounted on the post 11 and is adjustably secured thereto by a setscrew 13. An arm 14 is fixed to the collar 12 and projects therefrom so as to be disposed above and with its axis crosswise of the base 9 and parallel to the plane of said base.

A semicircular plate 15 is secured immovably to the outer end of the arm 14 so as to be disposed in a vertical plane and crosswise of the arm 14. The straight edge of the plate 15 constitutes the bottom edge thereof, and the outer side of said plate has a protractor scale 16 inscribed along at least a part of its semicircular upper edge. A collar 17 is turnably mounted on the arm 14, adjacent the plate 15, and is adjustably secured thereto by a setscrew 18. A post 19 projects upwardly from the collar 17. A bar 20 is secured to and extends longitudinally of the post 19 and has a projection 21 at its upper end which extends outwardly from the post in a direction toward the end of the base 9, disposed remote from the post 11. The projection 21 is provided with an outwardly opening V-shaped notch forming a cradle for receiving a golf club shaft, as will hereinafter be described. A pointer 22 is secured to the upper end of the post 19 and extends outwardly and downwardly therefrom over a portion of the arcuate edge of the plate 15, as seen in FIG. 3.

A block 23 is secured to the upper side of the base 9 adjacent the corner thereof opposite to the corner adjacent to which the block 10 is secured. A semicircular transparent plate 24 is secured to and supported by the block 23 in a vertical plane and with its straight edge constituting the bottom edge thereof. The plate 24 is inscribed with a protractor scale 25, extending at least along a portion of its arcuate upper edge, as seen in FIG. 2, so that it can be read from a position beyond the end of the device 8, as seen in FIG. 2, or from beyond the left hand end thereof, as seen in FIG. 3.

A disc 26 is supported for rotation on the base 9, about a pivot or axis 27 disposed centrally thereof, inwardly of and adjacent the block 23. A semicircular strip 28 is secured to the upper side of the base 9, around the inner half of the disc 26 and is inscribed on its upper side with a protractor scale 29. A pointer 30 is fixed to an projects from a part of the periphery of the disc 26 and overlies a part of the strip 28.

A substantially rigid, transparent plate 31 is connected by a hinge 32 to a part of the upper surface of the disc 26, so as to be disposed with its plane parallel to the axis of the pointer 30, as seen in FIG. 1. The outwardly facing side of the plate 31 has a linear scale 33 inscribed along one vertical edge thereof. A setscrew 34 is threaded into or through the disc 26, and may be advanced against the base 9 for securing the disc 26 immovably thereto, or may be retracted out of engagement with the base 9 to permit rotation of the disc 26 thereon about its pivot 27. A pointer 35 projects from adjacent the upper edge of the plate 31 toward the plate 24 and terminates adjacent a part of the arcuate edge of said plate 24 to function with the scale 25.

As seen in FIGS. 4, 5 and 6, the head 36 of a golf club 37 is positioned on the center of the disc 26 as defined by its pivot 27 and a portion of the shaft 38 of the club is positioned in the V-shaped notch of the cradle 21. The setscrew 13 is loosened so that the collar 12 and the parts 13 to 22, carried thereby, can be moved upwardly or downwardly on the post 11 until the curve of the soleplate, not shown, constituting the underside of the club head 36, is resting on and tangent to the disc 26 or its pivot 27. This is accomplished with the setscrew 18 loosened and the collar 17, and parts carried thereby, turned sufficiently relative to the arm 14 so that the club shaft 38 engages flush in the cradle 21, as seen in FIG. 6. With the parts thus positioned as heretofore described, the thumb screws 13 and 18 are tightened, after which the lie of the club 37, constituting the angle as measured between the plane of the base 9 and the axis of the shaft 38, can be read on the scale 16. As seen in FIG. 6, the lie of the club 37 is approximately 64°. While the instrument 8 is being set to read the lie of the club 37, the club head 36 is held substantially immovable on the disc 26 and pivot 27, and the shaft 38 is allowed to slide in the notch of the cradle 21.

The loft of the club 37, constituting the angle of the club face 39 relative to the vertical, is measured with the disc 26 positioned with a face angle reading of zero on the scale 29, as seen in FIG. 1. The disc 26 is locked in this position by advancing the setscrew 34 against the base 9. The plate 31 is swung downwardly to a position tangent to the curve of the club face 39 at the center of the insert 40, as seen in FIG. 5, so that the angular measurement, constituting the loft of the club 37, can be read by the position of the pointer 35 relative to the scale 25, as seen in FIG. 5.

The face angle of the club 37, or the angle of the club face 39 relative to a plane perpendicular to the base 9 and intersecting the axis of the club shaft 38, is obtained by loosening the setscrew 34 and rotating the disc 26 until the plate 31 is tangent to the curve of the club face at the center of the insert 40, as seen in FIG. 4. The face angle is then read from one of the two halves of the protractor scale 29. As illustrated in FIG. 4, the club 37 is shown as having a closed face angle of approximately 6°. If the pointer 30 was disposed on the other side of the zero graduation of the scale 29, the club would have an open face angle.

The height of the club face 39 is found by utilizing the scale 33 with the plate 31 in an upright position and against the botton edge of the face 39, as seen in FIG. 4, so that the height of the face can be read from a position facing the side of the instrument 8, as seen in FIG. 6.

A flexible or elastic band 41 may be utilized to retain the club shaft 38 in the cradle 21 while allowing the cradle to slide relative to the shaft or the shaft to slide in the cradle, either without the shaft lifting out of the cradle.

The instrument 8 may be utilized in the aforedescribed manner for analyzing various types of golf clubs.

Various modifications and changes are contemplated and may be resorted to without departing from the function or scope of the invention.

I claim as my invention:

1. An instrument for use in analyzing a golf club comprising a substantially rigid base, an upright fixed to and rising from said base, an arm projecting from said upright and disposed with its axis parallel to the plane of said base, a cradle adapted to receive the shaft of a golf club, means mounting said cradle in different rotatively adjusted positions around said arm, a protractor fixed to the arm, a pointer carried by the cradle and disposed for movement over the scale of the protractor for indicating the angle formed by the axis of the shaft and the underside of the club head when the club head is resting on the base, and said base including a disc constituting a rotatable section thereof on which the club head is supported.

2. An instrument as in claim 1, a second protractor secured to the upper side of said base around a portion of said disc, a pointer projecting from a part of the periphery of the disc for movement over the scale of the second protractor, a plate supported by and rising from a part of the disc, spaced from the center thereof, and adapted to be positioned parallel to the bottom edge of the face of the club head by rotation of said disc relative to the club head for determining the face angle of the club by the location of the disc pointer relative to the scale of the second protractor.

3. An instrument as in claim 1, a plate, means hingedly connecting the plate to the upper side of said disc for swinging movement about a substantially horizontal axis, a third protractor fixed to and rising from said base and disposed with its plane crosswise of the plane of said plate in one position of rotation of the disc, whereby when the plate is swung about its hinge to position the plate flush against or parallel to the club face the angle formed by said plate and disc, constituting the loft of the club, can be read on the scale of the third protractor.

4. An instrument as in claim 3, and means for securing the disc immovably to the base for positioning the plate crosswise of the third protractor.

5. An instrument as in claim 3, and a pointer projecting from a side edge of said plate, located adjacent the third protractor, for movement along the scale thereof.

6. An instrument as in claim 5, said third protractor being formed of a transparent material to enable the loft of the club face to be read from either side of the protractor.

7. An instrument as in claim 1, a plate formed of a transparent material mounted on the base and having a vertically disposed linear scale for measuring the height of the club face when viewed through said plate.

8. An instrument as in claim 1, and means for slidably retaining the club shaft in the cradle.

9. An instrument as in claim 1, and means for adjustably securing the arm to the upright.

* * * * *